Figure 1:
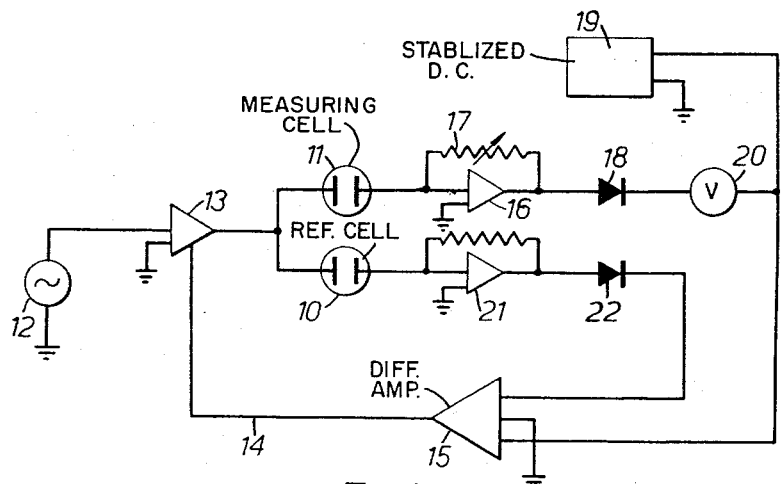

Dec. 12, 1967  D. W. BIRNSTINGL  3,358,223
CONCENTRATION METER
Filed Aug. 26, 1963

INVENTOR
DAVID WILDON BIRNSTINGL
By Irwin S. Thompson
ATTORNEY.

3,358,223
CONCENTRATION METER
David Wildon Birnstingl, Amberley, England, assignor to Mawdsley's Limited, Dursley, England
Filed Aug. 26, 1963, Ser. No. 304,552
Claims priority, application Great Britain, Aug. 27, 1962, 32,753/62
6 Claims. (Cl. 324—30)

This invention relates to concentration meters.

Conductivity comparison meters act to compare the conductivity of a liquid with a reference liquid, and they are particularly suitable for measuring the concentration of electrically non-conducting solids suspended in a conducting liquid which is usually known as the "mother liquor." For this purpose the conductivity of the liquid suspension in a measuring cell is compared with the conductivity of the mother liquor alone in a reference cell. The change in conductivity of the liquid resulting from the presence of the suspended solids is a measure of the solids concentration: expressed mathematically, if $Y1$ is the conductivity of the mother liquor and $Y2$ the conductivity of the mixture, the concentration $Q$ is given by the equation:

$$Q = 1 - Y2/Y1$$

With an arrangement measuring conductivity in the above manner the conductivity of the mother liquor may continuously vary between wide limits as a result for example of temperature changes and variations in composition of the liquor, and the object of the invention is to provide a measuring circuit which when used with such an arrangement automatically compensates for variations of conductivity of the mother liquor.

According to the invention a measuring circuit of a conductivity comparison meter comprises an A.C. source for supplying a measuring cell and a reference cell in parallel, and a feedback loop controlling the source in such manner that in use the current through the reference cell remains substantially constant. Thus any change in current through the measuring cell, which is measured by the circuit, is proportional to the change in concentration of the solids in that cell and is not affected by variation in the conductivity of the mother liquor itself.

Preferably both cells are connected in low impedance circuits so that both cell circuits are substantially independent of circuit impedance and depend solely upon the current source and the conductivity of the cell liquids. Each cell circuit may include a low impedance input amplifier the output of which is proportional to the corresponding cell current, and preferably the gain of one or both of the amplifiers is adjustable for setting up and calibration purposes.

The output of the measuring cell amplifier may be rectified and compared with a reference voltage which is conveniently provided by a stabilized voltage source, and the output of the reference cell amplifier may be used as a control signal of the feedback loop. This signal may also be rectified and fed to a differential amplifier of the feedback loop to which a reference voltage provided by the stabilized voltage source is also fed, the differential amplifier providing a D.C. feedback signal which controls the A.C. source. The latter may include an oscillator and an amplifier the gain of which is controlled by the D.C. output of the differential amplifier of the stabilizing feedback loop.

Figure 2:
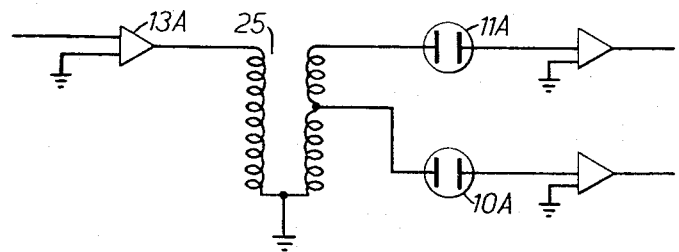
Figure 3:
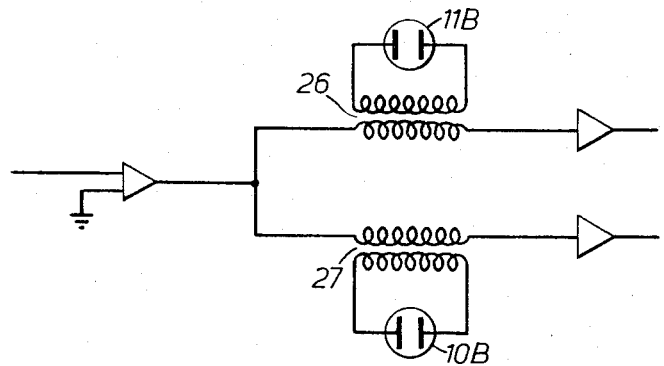

A conductivity comparison meter representing one embodiment of the invention, and two possible modifications thereof, will now be described by way of illustration and example with reference to the accompanying drawings in which:

FIGURE 1 is a circuit diagram of a comparison meter in accordance with the invention, and FIGURES 2 and 3 are diagrams of alternative circuits for supplying current to the two conductivity cells.

In FIGURE 1 the meter has two generally similar cells 10, 11 in the form of pipes each cell provided with a pair of opposed electrodes and respectively forming a reference cell 10 and a measuring cell 11, to the former of which the mother liquor is supplied and to the other of which the liquid containing the solid particles whose concentration is to be measured is supplied.

The circuit of the meter comprises an A.C. source provided by an oscillator 12 feeding into an amplifier 13 the gain of which is varied by a feedback signal from a feedback loop 14 of the circuit which includes a differential amplifier 15 the output of which provides the signal. The output from the source amplifier 13 is applied to one electrode of each cell 10, 11.

The other electrode of the measuring cell 11 is connected to the input of a measuring cell amplifier 16 having a very low input impedance and a stabilized gain which can be adjusted by means of a potentiometer 17. As a result of the low input impedance the current through the measuring cell 11 is virtually unaffected by the amplifier impedance whatever the conductivity of the liquid being measured. The amplifier output is rectified by a diode 18 and compared with a reference voltage provided by a stabilized D.C. voltage source 19, the comparison being effected by means of a voltmeter 20 suitably calibrated so that the voltmeter reading indicates the concentration to be measured when the meter is correctly set up.

The other electrode of the reference cell 10 is similarly connected to the input of a low impedance reference cell amplifier 21 the gain of which is also stabilized and the output of which is again rectified by means of a diode 22. In this case the rectified output voltage is fed to one input terminal of the differential amplifier 15; the other input terminal of the differential amplifier is supplied from the stabilized voltage source 19.

The meter is used continuously to measure the concentration of solids in the mother liquor passing through the measuring cell 11 and mother liquor is supplied continuously to the reference cell 10. At any instant the mother liquor supplied to the reference cell 10 is the same as the liquid supplied to the measuring cell even though the characteristics of the liquid in both cells may vary from time to time.

If there is any difference between the two voltages supplied to the differential amplifier a D.C. feedback signal is produced by the differential amplifier, and this signal on the feedback loop 14 acts to alter the gain of the source amplifier 13 in a manner which controls the current through the reference cell 10 until the rectified output of the reference cell amplifier is again equal to the stabilized reference voltage from source 19. Thus the voltage applied to the reference cell 10 is automatically maintained at a value such that the current through that cell remains substantially constant.

The same voltage is applied to the measuring cell 11, so that if the conductivity of the mother liquor alters without any change in the concentration of solids in the measuring cell there is no change in current through that cell Thus any change in cell current which is indicated by the voltmeter is due to a change in the concentration of the suspended solids.

The equipment is now ready for use, and if the liquid flowing through the measuring cell contains suspended solids the voltmeter gives a reading proportional to the change in conductivity in the measuring cell due to the presence of the suspended solids.

FIGURES 2 and 3 illustrate different circuits for achieving impedance matching. In FIGURE 2 the two conductivity cells, 10A and 11A are supplied from different tappings on a transformer 25, whose primary winding is energized by the amplifier 13A, corresponding to amplifier 13 of the first example. The remainder of the circuit also corresponds with the first example. The currents through the two cells are therefore proportional, but not necessarily equal. Alternatively, instead of providing two tappings on the secondary winding, the transformer may be provided with two separate secondary windings, one for each cell.

In FIGURE 3 each cell 10B and 11B is supplied by a separate transformer 26, or 27, so that its effective resistance, seen with respect to the primary terminals, is increased in proportion to the square of the turns ratio of the transformer.

I claim:

1. A concentration meter for measuring the concentration of solids suspended in a mother liquor, comprising a reference cell through which a reference sample of said mother liquor can be passed, two spaced electrodes in said reference cell, a measuring cell through which said mother liquor with suspended solids can be passed, two further spaced electrodes in said measuring cell, an electrical circuit in which said measuring and reference cells are connected, said circuit having an A.C. power source connected to a first electrode of each of the reference and measuring cells, first amplifying means connected to a second electrode of said reference cell, further amplifying means connected to a second electrode of said measuring cell, a D.C. differential amplifier an output terminal of which is connected by means of a feedback loop to the A.C. source, rectifying means interposed between said first amplifying means and one input terminal of the differential amplifier, with said reference cell, said first amplifying means and said rectifying means in series, a stabilized D.C. voltage source connected both to another input terminal of the differential amplifier and to voltage indicating means, and further rectifying means interposed between said further amplifying means and said voltage indicating means, with said measuring cell, said voltage amplifying means and said further rectifying means in series, in use the differential amplifier producing a D.C. feedback signal which controls the A.C. source so as substantially to equalize D.C. signals respectively fed to said one and said another input terminals of the differential amplifier so that a substantially constant current is passed through the reference cell, whereby the voltage indicating means provide a reading which is directly indicative of the concentration of solids in said measuring cell.

2. A concentration meter according to claim 1, wherein said A.C. source comprises an oscillator connected to a source amplifier the gain of which is varied in accordance with the magnitude of the D.C. feedback signal.

3. A concentration meter according to claim 1, wherein said indicating means is a voltmeter calibrated in terms of solids concentration.

4. A concentration meter according to claim 1, wherein an impedance matching means is interposed between said A.C. power source and said first electrode of each of the reference and measuring cells.

5. A concentration meter according to claim 4, wherein the impedance matching means comprises a transformer the primary winding of which is connected to said A.C. power source and the secondary winding of which has tapped connections for leading to the measuring and reference cells respectively.

6. A concentration meter according to claim 4, wherein the impedance matching means comprises two separate transformers, the primary windings of which are connected to said A.C. power source and the secondary windings of which are respectively connected to the measuring and reference cells.

References Cited

UNITED STATES PATENTS 3,056,919 10/1962 Kuipers _____ 324—30
3,131,346 4/1964 Parke _____ 324—30

RUDOLPH V. ROLINEC, *Primary Examiner.*

WALTER L. CARLSON, *Examiner.*

C. F. ROBERTS, *Assistant Examiner.*